C. WESTROSS.
FISH HOOK.
APPLICATION FILED JAN. 19, 1917.
1,237,429.
Patented Aug. 21, 1917.
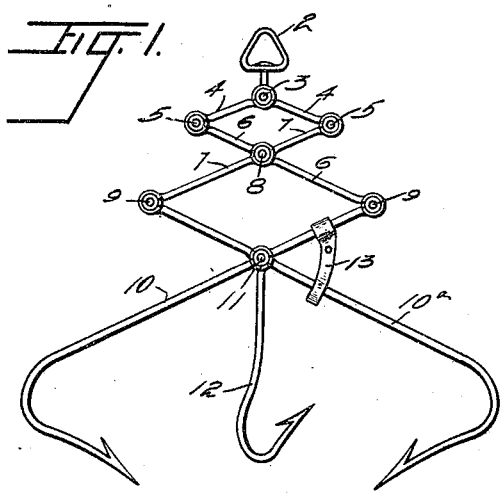
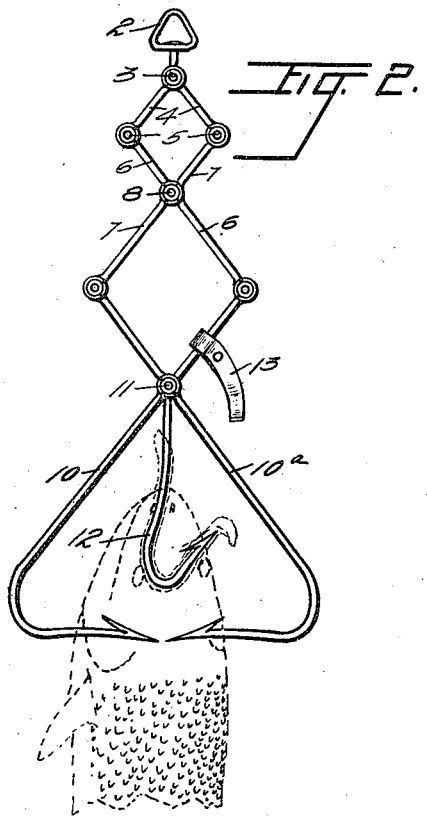
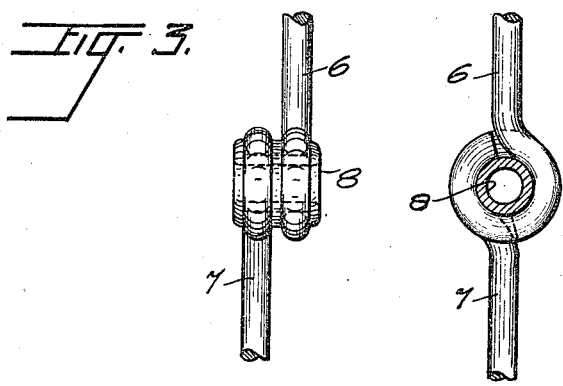
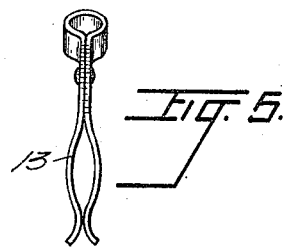
WITNESSES:
INVENTOR
C. Westross
BY
H. J. Sanders
ATTORNEY

UNITED STATES PATENT OFFICE.

CARL WESTROSS, OF PORTLAND, MAINE.

FISH-HOOK.

1,237,429.  Specification of Letters Patent.  Patented Aug. 21, 1917.

Application filed January 19, 1917. Serial No. 143,301.

*To all whom it may concern:*

Be it known that I, CARL WESTROSS, a citizen of Sweden, residing at Portland, in the county of Cumberland and State of Maine, have invented certain new and useful Improvements in Fish-Hooks, of which the following is a specification.

This invention relates to improvements in fish hooks and its object is to produce a fish hook that is positive and efficient in operation. With the foregoing and other objects in view the invention consists in the combination and arrangement of parts to be hereinafter fully described in this specification, pointed out in the appended claims and illustrated in the accompanying drawing which forms a part of said specification and in which—

Figure 1 is a front elevation of the hook, set.

Fig. 2 is a similar view of the hook, sprung, showing the manner in which the fish is impaled.

Fig. 3 is an enlarged fragmentary view illustrating the pivotal supports for the lever ends.

Fig. 4 is a side view of Fig. 3.

Fig. 5 is a front view of the keeper employed.

Like reference characters denote corresponding parts throughout the several views.

My improved hook comprises a connecting pin 1 supported by a yoke 2 and said pin 1 carries the pivot 3 whereon the adjacent ends of the levers 4 are supported which levers at their remote extremities are supported upon similar lateral pivots 5. Crossed levers 6, 7 are supported upon said pivots 5 and are formed with fulcrum eyes through which the pin or pivot 8 extends, the remaining ends of said levers being connected to pivots 9; and the distance from either pivot 9 to the pin 8 being greater than the distance from pin 8 to either pivot 5.

Upon the pivots 9 the twin crossed strikers 10$^a$ are secured and each of which is formed with a fulcrum eye through which eyes the pin 11 passes which pin also pivotally supports a bait hook 12 the free end of which is normally disposed approximately midway between the free or hooked ends of the strikers 10, 10$^a$. To striker 10 between the pin 11 and pivot 9 a keeper 13 is secured, the free end of which comprises a pair of spring-like members adapted to receive and yieldingly retain the striker 10$^a$ in fixed position with relation to the striker 10 so that the free ends of the strikers will be yieldingly retained the maximum distance apart.

The operation of the hook is as follows: The fish swallows the bait and hook 12 and thereby causes a downward pull upon the hook 12 and upon the pivot 11. Ordinarily the hook 12 would be sufficient to hold the fish. This pull may be sufficient to release the striker from the free end of the keeper 13, and should this pull not prove sufficient to cause action the subsequent efforts of a strong or wily fish will be sufficient, and drive the free ends of both 10, 10$^a$ into the body of the fish impaling him securely as shown (Fig. 2).

What is claimed is:—

1. In a fish hook, a pair of levers having their adjacent ends supported upon a common pivot and their remote ends supported upon relatively remote pivots; crossed levers having one pair of opposite ends supported upon the last named pivots and their remaining ends supported upon another pair of pivots, alined fulcrum eyes formed in said crossed levers, a pin connecting said fulcrum eyes, crossed hooks pivotally supported upon the last named pivots, alined fulcrum eyes formed in said crossed hooks, a pin connecting said last named fulcrum eyes, a bait hook pivotally connected to said pin and a keeper carried by one of said hooks for releasable engagement with the other hook whereby said hooks are yieldingly retained in fixed relation.

2. In a fish hook, a pair of levers having their adjacent ends supported upon a common pivot, crossed levers pivotally connected to said first named levers, fulcrum eyes formed on said crossed levers and pivotally connected, crossed hooks pivotally connected to said crossed levers, fulcrum eyes formed in said crossed hooks, a pin connecting said last named fulcrum eyes, a bait hook pivotally supported by said pin, and a keeper carried by one of said crossed hooks for yielding engagement with the other hook whereby said hooks are normally retained in fixed relation.

In testimony that I claim the foregoing as my own I have hereto affixed my signature in the presence of two subscribing witnesses.

CARL WESTROSS.

Witnesses:
S. FRANK PIERCE,
ROBERT W. DE WOLFE.

Copies of this patent may be obtained for five cents each, by addressing the "Commissioner of Patents, Washington, D. C."